US012443694B2

United States Patent
Proskurin et al.

(10) Patent No.: US 12,443,694 B2
(45) Date of Patent: Oct. 14, 2025

(54) PROCESS CREDENTIAL PROTECTION

(71) Applicant: BedRock Systems, Inc., San Francisco, CA (US)

(72) Inventors: Sergej Proskurin, Munich (DE); Sebastian Wolfgang Vogl, Munich (DE); Robert Gawlik, Freiburg (DE); Jonas Pfoh, Dresden (DE)

(73) Assignee: BLUEROCK SECURITY, INC., San Francisco, CA (US)

( * ) Notice: Subject to any disclaimer, the term of this patent is extended or adjusted under 35 U.S.C. 154(b) by 238 days.

(21) Appl. No.: 18/458,908

(22) Filed: Aug. 30, 2023

(65) Prior Publication Data
US 2024/0070260 A1  Feb. 29, 2024

Related U.S. Application Data

(60) Provisional application No. 63/402,913, filed on Aug. 31, 2022.

(51) Int. Cl.
*G06F 21/44* (2013.01)
*G06F 9/455* (2018.01)

(52) U.S. Cl.
CPC .......... *G06F 21/44* (2013.01); *G06F 9/45558* (2013.01); *G06F 2009/45587* (2013.01)

(58) Field of Classification Search
CPC ................. G06F 21/44; G06F 9/45558; G06F 2009/45587

(Continued)

(56) References Cited

U.S. PATENT DOCUMENTS 9,223,962 B1 * 12/2015 Kashyap ................. G06F 21/52
10,447,728 B1 * 10/2019 Steinberg ................ H04L 63/10
(Continued)

FOREIGN PATENT DOCUMENTS

| CN | 111291364 A | 6/2020 | |
| CN | 111291364 B * | 3/2024 | ............. G06F 21/52 |
| WO | 2015/127461 A1 | 8/2015 | |

OTHER PUBLICATIONS

International Search Report and Written Opinion, PCT App. No. PCT/US2023/073202, Dec. 26, 2023, 09 pages.

*Primary Examiner* — Zi Ye
(74) *Attorney, Agent, or Firm* — NICHOLSON DE VOS WEBSTER & ELLIOTT LLP

(57) ABSTRACT

Process credential protection in a virtualized system is described. In-guest process credentials of a guest operating system are registered including binding the process credentials with the following values: a guest address of a first structure that includes subjective credentials, a guest address of a second structure that includes a context in which the process credentials reside, and data fields of the first structure that are not subject to change. A first tag is created from at least the information bound with the process credentials and stored. An integrity verification check is performed at a verification point that is triggered by a function or system call being called by the guest operating system, and includes creating a second tag from at least the information bound with the process credentials and determining if the first tag and second tag match. If they do not match, then the integrity of the in-guest process credentials has been compromised and remedial action is taken.

22 Claims, 10 Drawing Sheets

(58) Field of Classification Search
USPC .......................................................... 726/18
See application file for complete search history.

(56) References Cited

U.S. PATENT DOCUMENTS

| | | |
|---|---|---|
| 2012/0151206 A1 | 6/2012 | Paris et al. |
| 2014/0325618 A1 | 10/2014 | Sandland et al. |
| 2019/0068606 A1 | 2/2019 | Xiao et al. |
| 2021/0390182 A1* | 12/2021 | Boutnaru ................ G06F 21/52 |

* cited by examiner

CREDENTIAL OBJECT TRACKING STRUCTURE 314

| STRUCT CRED ADDRESS 410 | CONTEXT (ADDRESS TASK_STRUCT) 412 | TAG 414 | CURRENT STATE 416 |
|---|---|---|---|
| ADDRESS 1 | ADDRESS 11 | HASH(ADDR 1, ADDR 11, STRUCT CRED OBJ_1) | ASSIGNED |
| ADDRESS 2 | ADDRESS 12 | HASH(ADDR 2, ADDR 12, STRUCT CRED OBJ_2) | ASSIGNED_PRIV |
| ADDRESS 3 | ADDRESS 13 | HASH(ADDR 3, ADDR 13, STRUCT CRED OBJ_3) | ASSIGNED _KERNEL |
| ADDRESS 4 | ADDRESS 14 | HASH(ADDR 4, ADDR 14, STRUCT CRED OBJ_4) | INVALID |
| ADDRESS 5 | ADDRESS 15 | HASH(ADDR 5, ADDR 15, STRUCT CRED OBJ_5) | COMMITTED |
| ... | ... | | ... |
| ADDRESS N | ADDRESS L | HASH(ADDR N, ADDR L, STRUCT CRED OBJ_N) | INVALID |

FIG. 4

PROCESS CREDENTIAL PROTECTION

CROSS-REFERENCE TO RELATED APPLICATIONS

This application claims the benefit of U.S. Provisional Application No. 63/402,913 filed Aug. 31, 2022, which is hereby incorporated by reference.

FIELD

Embodiments of the invention relate to the field of virtualization; and more specifically, to process credential protection.

BACKGROUND

Virtualization makes it possible for multiple operating systems (OSs) to run concurrently on a single host system without those OSs needing to be aware of the others. The single physical host machine is multiplexed into virtual machines (VMs) on top of which unmodified OSs (referred to as guest OSs) can run. Conventional implementations include a software abstraction layer between the hardware (which may support full virtualization) and the hosted operating system(s). The virtualization layer translates between virtual devices and the physical devices of the platform. In a fully virtualized environment, a guest operating system (OS) can run a virtual machine without any modifications and is typically unaware that it is being virtualized. Paravirtualization is a technique that makes a guest OS aware of its virtualization environment and requires hooks to a guest OS which requires access to its source code, or a binary translation be performed.

Although virtualization relies on hardware support, a software component called a microkernel runs directly on the hardware of the host machine and exposes the VM to the guest OS. The microkernel is typically the most privileged component of the virtual environment. The microkernel abstracts from the underlying hardware platform and isolates components running on top of it. A virtual machine monitor (VMM) manages the interactions between virtual machines and the physical resources of the host system. The VMM exposes an interface that resembles physical hardware to its virtual machine, thereby giving the guest OS the illusion of running on a bare-metal platform. As compared to the microkernel, the VMM is a deprivileged user component whereas the microkernel is a privileged kernel component.

Virtual Machine Introspection (VMI) is a technique conventionally used to observe hardware states and events and can be used to extrapolate the software state of the host. VMI leverages the property of a VMM that has access to all the state of a virtual machine including the CPU state, memory, and I/O device state.

Many modern operating systems use credentials that describe the properties of various objects to allow the kernel to enforce access control and capability management. These credentials may specify the object's subjective credentials where the object acts upon another object and/or the object's objective credentials where that object is acted upon. For instance, each process or thread may be associated with credentials that is used by the kernel to determine whether a particular action, such as a specific syscall, is allowed to be executed by the process or thread. A privilege escalation attack tries to illegally elevate privileges of a process or thread such as by replacing or updating the credential structure object of that process or thread with elevated permissions (including, for example, root permissions). In Linux, for example, each task may be assigned credentials that are held in or through a structure called "cred." A privilege escalation attack may try to overwrite the process credentials of the object in cred or redirect the cred pointer in task_struct to an injected or existing structured instance with higher privileges.

SUMMARY

Process credential protection in a virtualized system is described. In-guest process credentials of a guest operating system are registered including binding the process credentials with the following values: a guest address of a first structure that includes subjective credentials, a guest address of a second structure that includes a context in which the process credentials reside, and data fields of the first structure that are not subject to change. A first tag is created from at least the information bound with the process credentials and stored. An integrity verification check is performed at a verification point that is triggered by a function or system call being called by the guest operating system, and includes creating a second tag from at least the information bound with the process credentials and determining if the first tag and second tag match. If they do not match, then the integrity of the in-guest process credentials has been compromised and remedial action is taken.

BRIEF DESCRIPTION OF THE DRAWINGS

The invention may best be understood by referring to the following description and accompanying drawings that are used to illustrate embodiments of the invention. In the drawings:

FIG. 4 shows an exemplary credential object tracking structure according to an embodiment.

DESCRIPTION OF EMBODIMENTS

Figure 1:
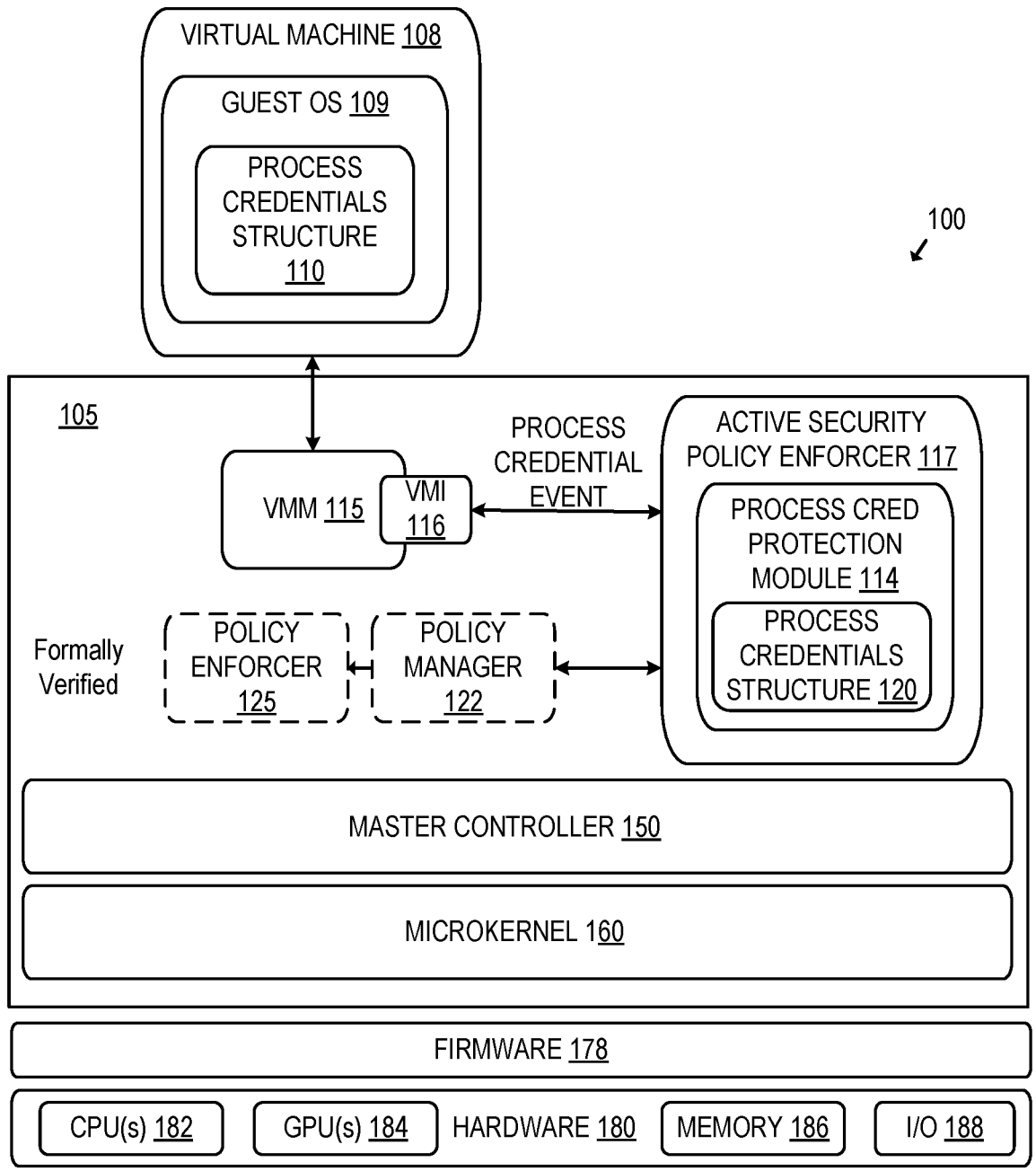
FIG. 1 is a block diagram that illustrates an exemplary architecture for a virtualized system performing process credential protection according to an embodiment.

Process credential protection is described. A process credential protection module observes the process credentials of a guest operating system to identify potential corruptions of the process credentials indicating malicious behavior. Corrective action may then be taken. The process credential protection module binds the process credentials to: the subjective credentials (e.g., represented by the address of the struct cred instance), the context in which the credentials reside (e.g., represented by the address of the struct task_struct instance, and at least part of the content of the cred instance. A tag, which may be a hash value or an HMAC value, is generated from this information. The process credential protection module protects the integrity of a committed credential object through verification of the hash value or HMAC value. The process credential protection module tracks the lifecycle of the tracked credential objects in the form of a state machine and blocks or alerts upon transition violations.

The Linux kernel is described as an example throughout this description. However, like techniques may be used with other operating systems unless otherwise noted.

The Linux kernel allocates a dedicated slab cache, called cred_jar, to hold and maintain most instances of cred (cred includes information that Linux uses to perform security checks each time an object acts (e.g., each task) upon another object (e.g., file, semaphore, task)); this includes allocated as well as free objects of type cred. The only exception to this rule is presented by the high-privileged kernel credentials that are statically allocated for the kernel_init task (the first kernel thread, swapper, with PID=0). The Linux kernel consults the cred_jar slab cache to allocate a new set of credentials. There are two places in the Linux kernel that take on the role of allocating a new set of credentials (via kmem_cache_alloc(cred_jar, <gfp_flags>)): prepare_creds( ), and prepare_kernel_cred( ). Thus, all credential-related routines build upon these two functions to allocate a new set of credentials. Specifically, the function prepare_creds( ) allocates a new instance of cred and makes a copy of the objective credentials of the current thread (current→cred). The function prepare_kernel_cred( ) similarly allocates a new instance of cred and creates a copy of credentials of a high-privileged thread; depending on the arguments, this function creates either a copy of credentials of the given (privileged) task, or of the kernel credentials that are maintained by the task kernel_init (swapper). If a thread creates a clone of itself (e.g., via fork( )), it copies the credentials of the parent process to the newly created process. To achieve this, the system call fork( ) eventually calls the function copy_cred(s) to (i) prepare a copy of credentials (via prepare_creds( )) of the currently active task (current) and (ii) assign the copy to the recently created child.

Each time the Linux kernel executes a new program (e.g., via the exeve( ) family of functions), it will first prepare and adjust a new set of credentials (like the function fork( )) and commit the new credentials to the current task. Once a task has committed to a set of prepared credentials, the committed credentials do not change and thus are considered immutable. It is possible, however, that the process can override its credentials.

A process credential protection module, which may exist in a hypervisor of a virtualized system, registers (or sometimes referred to as tracks) new credentials. For example, in the case of a Linux operating system, the process credential module registers new credentials when the following functions are called or executed: prepare_kernel_cred( ) and copy_creds( ). New credentials are also sometimes registered when the function commit_creds( ) is called. The process credential protection module releases the registered information upon executing or calling a release function, such as put_cred_rcu( ).

As part of registering new credentials, a unique identifier for the new credentials structure (e.g., a unique identifier for the new cred) is created. The unique identifier may be a hash value or a Hash-based Message Authentication Code (HMAC) value, and is sometimes referred herein as a tag. The hash value or HMAC value may be created from at least part of the credential structure (e.g., sensitive data fields of the cred that do not include the maintenance fields and otherwise are not subject to change), the context in which the credentials reside (e.g., the address of the struct task_struct object belonging to a specific thread to which the credentials are or will be bound), the address of the new credentials structure (e.g., the address of the cred object), and if an HMAC value, a key or random value. This unique tag allows the process credential protection module to verify the tag upon selective verification point(s) throughout the lifetime of the credentials.

Further, as part of registering new credentials, the process credential protection module may create or update a credential object tracking structure (which may be in the form of a hash table) that includes the address of the cred, the context in which the credentials reside (e.g., the address of the struct task_struct object belonging to a specific thread to which the credentials are or will be bound), the created tag, and the current state.

The process credential protection module tracks the lifecycle of the tracked credential objects in the form of a state machine and blocks or alerts upon transition violations. In an embodiment, at least the following states are used: invalid, assigned, assigned_privileged, assigned kernel, and committed. The invalid state represents the default state of the new credential object and is used when allocating a new object representing credentials. The assigned state represents when credentials have been assigned to and not yet committed by a task. In an embodiment, a credential object is put into the assigned state upon the Linux kernel function "copy_creds" being called. The assigned_privileged state represents when the credentials of a privileged task (e.g., a kernel thread) have been copied and not yet committed by a task. In an embodiment, a credential object is put into the assigned_privileged state upon the Linux kernel function "prepare_kernel_cred( )" with a valid struct task_struct as argument being called. The assigned_kernel state represents when the credentials of a privileged task are copied of the kernel_init task swapper. In an embodiment, a credential object is put into the assigned_kernel state upon the Linux kernel function "prepare_kernel_cred( )" with a null argument being called. The committed state represents when the credentials have been committed. In an embodiment, a credential object is put into the committed state upon the Linux kernel function "commit_creds( )" being called.

The process credential protection module tracks the state transitions and may block and/or alert upon a violation. In an embodiment, the following state transitions are allowed (and all others are not allowed): invalid to assigned; invalid to assigned_privileged; invalid to assigned_kernel; invalid to committed; assigned to committed, and assigned_privileged to committed.

In an embodiment, the process credential protection module checks the integrity of the credential object using the stored tag value. For instance, at a verification point, the process credential protection module uses the same hash or HMAC function to generate a value and compares that with the stored tag value. These values will be the same if the credential object has not been modified. If the credential object has been modified, then these values will be different. If these values are not the same, the process credential protection module may cause remedial action to be taken (e.g., block the action and/or log/alert of the violation). In an embodiment, a verification point is performed at the Linux kernel function "security_task_alloc( )" that occurs during a "fork" system call. Other verification points may be performed at other LSM hooks (e.g., upon certain system calls).

FIG. 1 is a block diagram that illustrates an exemplary architecture for a virtualized system performing process credential protection according to an embodiment. The computing device 100 may be any type of computing device such as a desktop computer, a laptop computer, a server computer, a mobile device such as a smartphone or tablet, a wearable device, a set-top box, a medical computing device, a gaming device, an internet-of-things (IoT) device, or any other computing device that can implement a virtualized system. The computing device 100 executes a hypervisor 105.

The virtualized system includes a guest operating system 109 that may run on top of the virtual machine 108. The guest OS 109 may be unmodified. The guest OS 109 uses credentials that describe properties of various objects to allow the kernel to enforce access control and capability management. For instance, the process credentials structure 110 represents the in-guest process credentials. In an example where the guest OS 109 is a Linux operating system, the process credentials structure 110 may be a cred object and the context of the credentials may be specified in a task_struct structure. The process credentials structure 110 may include user and group real identifiers, user and group effective identifiers, user and group effective identifiers for file access, user and group saved identifier, capabilities the task's children can inherit, capabilities the task is permitted, capabilities that the task can actually use, a capability bounding set, and an ambient capability set. The guest OS 109 uses these credentials, for example, to determine whether a particular action such as a specific syscall is allowed to be executed by the task.

The virtual machine as 108 is assigned to the VMM 115 with virtual machine introspection (VMI). The VMM 115 may run as a user-level application in an address space on top of the microkernel 160 and supports the execution of the guest OS 109 (e.g., an unmodified guest OS) running in the VM 108. The VMM 115 emulates sensitive instructions and provides virtual devices. The VMM 115 manages the guest-physical memory of its associated virtual machine by mapping a subset of its own address space into the host address space of the VM 108. The VMM 115 can translate the guest virtual addresses to guest physical addresses. The VMM 115 can configure/modify access permissions of individual guest physical addresses in the system's second level address translation tables (slats). The VMM 115 can also map any of its I/O ports and memory-mapped I/O (MMIO) regions into the VM 108 to grant direct access to a hardware device. For example, the VMM 115 creates a dedicated portal for each event type and sets the transfer descriptor in the portals such that the microkernel 160 transmits only the architectural state required for handling the particular event. For example, the VMM 115 configures the portal corresponding to the CPUID instruction with a transfer descriptor that includes only the general-purpose registers, instruction pointer, and instruction length.

When a VM-exit event occurs, the microkernel 160 sends a message to the portal corresponding to the VM-exit event and transfers the requested architectural state of the virtual CPU to the handler execution context in the VMM 115. The VMM 115 determines the type of virtualization event from the portal that was called and then executes the correct handler function. To emulate instructions such as CPUID, the VMM 115 loads the general-purpose registers with new values and advances the instruction pointer to point behind the instruction that caused the VM exit. The VMM 115 transmits the updated state to the microkernel 160 and the virtual CPU can resume execution.

The VMM 115 provides one or more virtual devices for its guest OS 109. Each virtual device is modeled as a software state machine that mimics the behavior of the corresponding hardware device. When an instruction reads from or writes to an I/O port or memory-mapped I/O register, the VMM 115 updates the state machine of the corresponding device model in a like way as the physical hardware device would update its internal state. When a guest OS wants to perform an operation such as a disk read, the VMM 115 contacts the device driver for the host device to deliver the data.

The VMM 115 has full visibility into the entire guest state of its corresponding virtual machine 108 including hardware state (e.g., CPU state (e.g., registers), GPU state (e.g., registers), memory, I/O device state such as the contents of storage devices (e.g., hard disks), network card state, register state of I/O controllers, etc.), application and OS behavior, and code and data integrity. Virtual Machine Introspection (VMI) 116 is performed to inspect the guest and has visibility of every system call, resource access, and application/process launch and termination. For example, the VMM 115 can program the hardware to trap certain events which can be used by the VMI 116 to take and inspect the guest's state at that moment. Thus, the VMM 115 can inspect all interactions between the guest software and the underlying hardware. As an example, the VMM 115 can process and prepare events related to process credential protection.

The microkernel 160 of the hypervisor 105 may be a lightweight microkernel running at the most privileged level as required by its role to abstract hardware resources (e.g., the CPU) with a minimum interface, and may have less than 10kloc of code. The hardware 180 of the computing device 100 includes one or more central processing units (CPUs) 182, one or more graphics processing units (GPUs) 184, one or more memory units 186 (e.g., volatile memory such as SRAM or DRAM), and one or more input/output devices 188 such as one or more non-volatile storage devices, one or more human interface devices, etc. The hardware components are exemplary and there may be fewer pieces and/or different pieces of hardware included in the system. For instance, the hardware 180 may not include a GPU. Sitting atop the hardware 180 is the firmware 178. The firmware 178 may include CPU microcode, platform BIOS, etc.

The microkernel 160 drives the interrupt controllers of the computing device 100 and a scheduling timer. The microkernel 160 also controls the memory-management unit (MMU) and input-output memory-management unit (IOMMU) if available on the computing device 100. The microkernel 160 may implement a capability-based interface. A capability is a reference to a resource, plus associated auxiliary data such as access permissions. A null capability does not refer to anything and carries no permissions. An object capability is stored in the object space of a protection domain and refers to a kernel object. A protection domain object capability refers to a protection domain. An execution context object capability refers to an execution context. A scheduling context object capability refers to a scheduling context. A portal object capability refers to a portal. A semaphore object capability refers to a semaphore. A memory object capability is stored in the memory space of a protection domain. An I/O object capability is stored in the I/O port space of a protection domain and refers to an I/O port.

Running on top of the microkernel 160 are multiple hyper-processes. Each hyper-process runs as a separate protected and microkernel 160 enforced memory and process space, outside of the privilege level of the microkernel 160. In an embodiment, each hyper-process is formally verified. Some of these hyper-processes communicate with the microkernel 160 such as the master controller 150. The master controller 150 controls the operation of the virtualization such as memory allocation, execution time allotment, virtual machine creation, and/or inter-process communication.

Active security with policy enforcement may be performed by the virtualized system according to an embodiment. For instance, process credential protection in a virtualized system may be performed. As shown in FIG. 1, the active security and policy enforcement may be performed in coordination with the policy manager 122 and one or more policy enforcers such as the active security policy enforcer 117 and policy enforcer 125. An active security policy enforces the behavior of a guest OS or guest application. Example active security policies include: process credential protection, process allowance, process denial, driver allowance, driver denial, directory allowance, directory denial, file type allowance, file type denial, I/O device allowance, I/O device denial, limiting the number of writes to a particular register and/or limiting the values that can be in a particular register, and protecting a memory page (e.g., limiting writes or reads to specific memory pages, ensuring the memory is not executed). The process credential protection policy and enforcement is described in greater detail herein.

The active security policy enforcer 117 includes the process credential protection module 114. The process credential protection module 114 observes the process credentials of the guest OS 109 to identify potential corruption of the process credentials indicating malicious behavior. Corrective action may then be taken (either by the active security policy enforcer 117 or from another policy enforcer such as the policy enforcer 125). The process credential protection module 114 maintains the process credentials structure 120 that correspond to the in-guest process credentials structure 110. The process credentials structure 120 can be allocated separately from the in-guest process credentials structure 110. For each credential object, the process credential protection module 114 associates a hash value or an HMAC value with that credential object (e.g., with the address of the credential object). The process credential protection module protects the integrity of a committed credential object through verification of the hash value or HMAC value. The process credential protection module tracks the lifecycle of the tracked credential objects in the form of a state machine and blocks or alerts upon transition violations. The process credential protection module 114 is shown in more detail in FIG. 3 according to an embodiment.

In FIG. 1, VMI is used to observe the state of the guest OS 109 and create process credential events for the process credential protection module 114 to process. These process credential events may include an initial task event, a credential assign event, a credential assign privileged event, a credential commit event, a credential release event, and/or a credential verification event. The initial task event is for the first (statically configured) credentials for the first kernel thread swapper. The credential assign event is for credentials that have been assigned to a task but not yet committed. The credential assign privileged event is for credentials that have been copied from another privileged task. The credential commit event is for when a task commits to a set of credentials. The credential release event is for releasing previously assigned/committed credentials. The credential verification event is for verifying the integrity of the credentials.

The VMI hyper-process 116 has access to the state of the guest OS 109 including the CPU(s) 182, GPU(s) 184, memory 186, and I/O devices 188 in which the guest OS 109 is using. The VMI hyper-process 116 may include a semantic layer to bridge the semantic gap including reconstructing the information that the guest operating system has outside of the guest within the VMI hyper-process. For instance, the semantic layer identifies the guest operating system and makes the location of its symbols and functions available to the VMI hyper-process. In some embodiments, the VMI hyper-process monitors the system calls of the guest. A system call facilitates communication between the kernel and user space within an OS. The VMI hyper-process may request the corresponding VMM to trap one or more system calls to the VMI hyper-process.

In an embodiment where Linux is the OS, the VMI hyper-process 116 intercepts the kernel during, or soon after, the execution of the following functions: prepare_kernel_cred( ), copy_creds( ), commit_creds( ), and put_cred_rcu( ). In an embodiment, the VMI hyper-process does not hook the function prepare_cred( ) for performance reasons even though that is responsible for allocating most of the cred instances. Hooking prepare_creds( ) would induce many more traps into the VMM 115 that are not relevant because credentials become relevant when they have been committed (e.g., via commit_creds( )) or cloned during a fork (e.g., via copy_creds( )). In an embodiment, the VMI hyper-process 116 creates a credential assign event when it intercepts the function security_task_alloc( ) in copy_process( ), creates a credential assign privileged event when it intercepts the function prepare_kernel_cred( ), creates a credential commit event when it intercepts the function commit_creds( ), and creates a credential release event when it intercepts the function put_cred_rcu( ).

The VMI hyper-process 116 may create a tag that may be a hash value or an HMAC value created from at least part of the credential structure (e.g., sensitive data fields of the cred that do not include the maintenance fields and otherwise are not subject to change), the context in which the credentials reside (e.g., the address of the struct task_struct object belonging to a specific thread to which the credentials are or will be bound), the address of the new credentials structure (e.g., the address of the cred object), and if an HMAC value, a key or random value. The calculated tag may be included in the event transmitted to the process credential protection module 114. This tag allows the process credential protection module 114 to verify the tag upon selective verification point(s) throughout the lifetime of the credentials.

A credential event may include information about the in-guest credential object. For example, the following may be included for a credential commit event (corresponding to the function commit_creds( )), a credential assign privileged event (corresponding to the function prepare_kernel_cred( )), and a credential verification event (corresponding to the function security_task_alloc( ) that occurs during a fork system call: the address of the cred object, the context in which the credentials reside (represented by the address of the struct task_struct object belonging to a specific thread to which the credentials are or will be bound), and the tag associated with the credentials. As another example, the following may be included for a credential assign event (corresponding to the function copy_creds( )): the address of the cred object of the child, the child context in which the credentials reside (represented by the address of the struct task_struct object belonging to a specific thread to which the credentials are or will be bound), and the tag associated with the child credentials, the address of the cred object of the parent, and the parent context (represented by the address of the struct task_struct object of the parent). In a VMI implementation like that of FIG. 1, the data for the event is gathered by directly reading guest data structures from the host (e.g., directly reading the guest's physical memory).

The process credential protection module 114 registers (or tracks) new credential objects. In the case of a Linux OS, the process credential protection module 114 registers new credential objects when the when the following functions are called or executed (as reported in event format from the VMI hyper-process 116): prepare_kernel_cred( ) and copy_creds( ). The process credential protection module 114 may register new credential objects when the function commit_creds( ) is called or executed. As part of registering new credentials, the process credential protection module 114 creates a new process credentials structure 120 that corresponds to the in-guest process credentials structure 110 (e.g., creates a mirrored version of the new cred object).

Further, as part of registering new credentials, the process credential protection module 114 may create or update a credential object tracking structure (which may be in the form of a hash table) that includes the address of the cred, the context in which the credentials reside (e.g., the address of the struct task_struct object belonging to a specific thread to which the credentials are or will be bound), the created tag, and the current state.

The process credential protection module 114 tracks the lifecycle of the tracked credential objects in the form of a state machine and blocks or alerts upon transition violations. In an embodiment, at least the following states are used: invalid, assigned, assigned_privileged, assigned_kernel, and committed. The invalid state represents the default state of the new credential object and is used when allocating a new object representing credentials. The assigned state represents when credentials have been assigned to and not yet committed by a task. In an embodiment, a credential object is put into the assigned state upon the Linux kernel function "copy_creds" being called. The assigned_privileged state represents when the credentials of a privileged task (e.g., a kernel thread) have been copied and not yet committed by a task. In an embodiment, a credential object is put into the assigned_privileged state upon the Linux kernel function "prepare_kernel_cred( )" with a valid task_struct as argument being called. The assigned_kernel state represents when the credentials of a privileged task are copied of the kernel_init task swapper. In an embodiment, a credential object is put into the assigned_kernel state upon the Linux kernel function "prepare_kernel_cred( )" with a null argument being called. The committed state represents when the credentials have been committed. In an embodiment, a credential object is put into the committed state upon the Linux kernel function "commit_creds( )" being called.

The process credential protection module 114 tracks the state transitions and may block and/or alert upon a violation. In an embodiment, the following state transitions are allowed (and all others are not allowed): invalid to assigned; invalid to assigned_privileged; invalid to assigned_kernel; invalid to committed; assigned to committed, and assigned_privileged to committed.

In an embodiment, the process credential protection module 114 checks the integrity of the credential object using the stored tag value. For instance, at a verification point, the process credential protection module compares the current tag value with the stored tag value. These values will be the same if the credential object has not been modified. If the credential object has been modified, then these values will be different. If these values are not the same, the process credential protection module may cause remedial action to be taken (e.g., block the action and/or log/alert of the violation). In an embodiment, a verification point is performed at the Linux kernel function "security_task_alloc( )" that occurs during a "fork" function. Other verification points may be performed at other LSM hooks (e.g., upon certain system calls). The process credential protection module 114 may also check whether the current state is in an error state, and if so, cause remedial action to be taken (e.g., block the action, kill the task, and/or log/alert of the violation).

The policy manager 122, which is optional in an embodiment, manages policies for the virtualized system. As an example, a process credential protection policy may define the action that is taken when encountering a credential-related corruption during a verification point (e.g., log, notify, and/or block) and/or during an invalid state transition (e.g., log, notify, and/or block). The policies may be configured locally and/or remotely. The policy manager 122 installs the policies to one or more policy enforcement points that are referred to as policy enforcers. The process credential protection module 114 may be a policy enforcer as well as the policy enforcer 125. An action to be performed may be requested as an action request. An action request is an asynchronous request made by the policy manager 122. An action request includes the action requested and may include one or more parameters to specify how to execute the action. For example, a Kill Task action may include a process identifier (pid) parameter that specifies which task to terminate. Depending on the particular action, action requests can be sent to policy enforcers or be carried out by the policy manager 122 itself. For instance, a log event action request may be performed by the policy manager 122 itself. Policy enforcers accept action requests and perform the requested actions. Performing an action may cause one or more additional actions to be performed. For instance, an active security policy enforcer may offer a Kill Task action. An action request may result in the generation of new events, which can be sent to the policy manager 122. These can be sent asynchronously and the policy manager 122 may consider these for its own policy.

Figure 2:
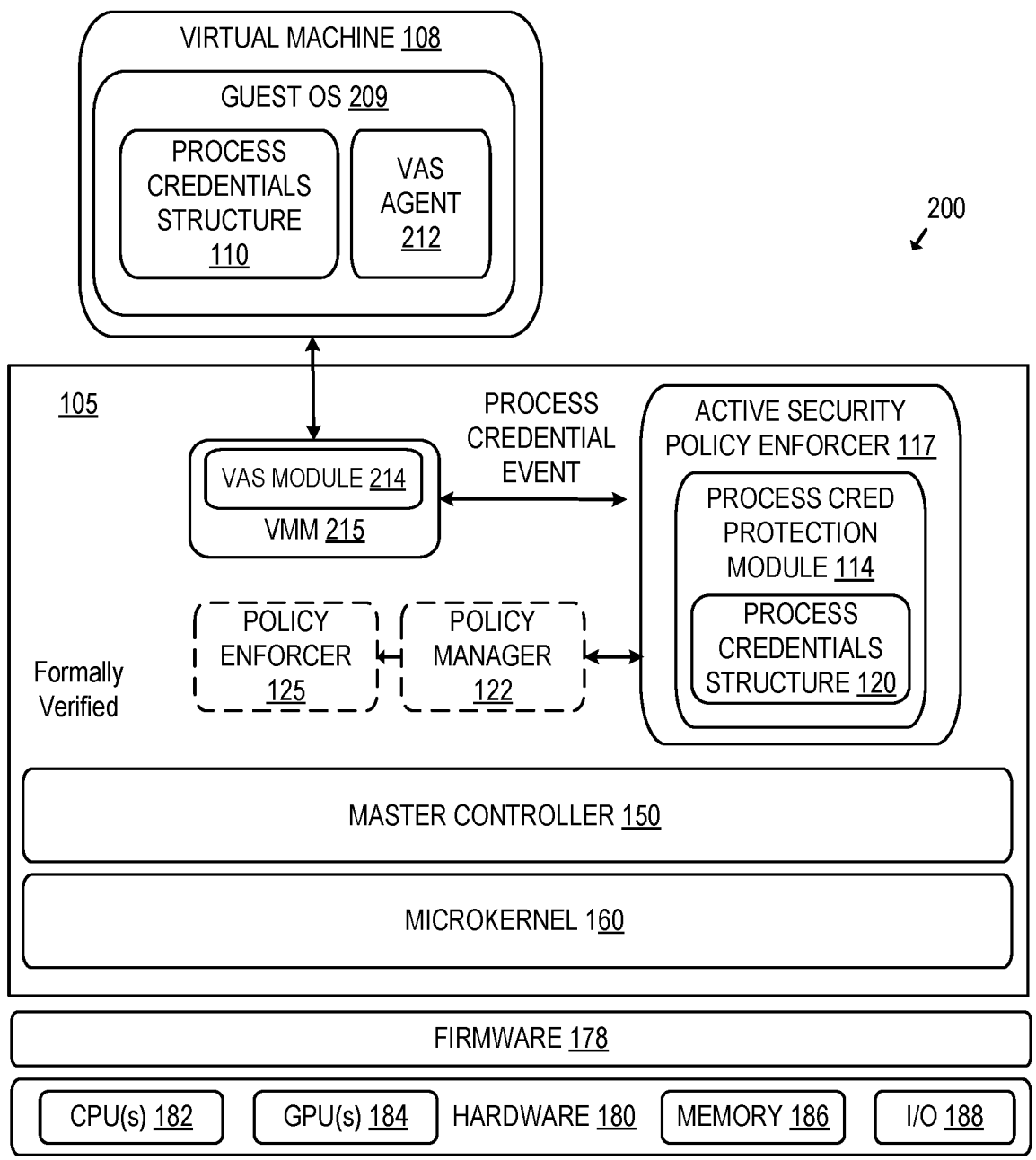
FIG. 2 is a block diagram that illustrates an exemplary architecture for a virtualized system performing process credential protection according to an embodiment.

FIG. 2 is a block diagram that illustrates an exemplary architecture for a virtualized system performing process credential protection according to an embodiment. The computing device 200 may be like the computing device 100. However, instead of an unmodified guest OS and using VMI, the embodiment of FIG. 2 uses a modified guest OS and does not use VMI. Instead, the computing device 200 uses virtualization-assisted security (VAS). In a VAS system, the guest OS is enlightened (it is aware of the host and its services).

The guest operating system 209 runs on top of the virtual machine 108. The guest OS 209 is modified to include the VAS agent 212 that leverages VAS features implemented in the VAS module 214 included in the VMM 215. The VAS agent 212 may be an extension to a kernel of the guest OS 209. The VAS agent 212 prepares the information needed for the VAS module 214 to implement the process credential protection features. For instance, the VAS agent 212 is configured to detect predefined functions related to the process credentials. Such functions may be, in case of Linux: security_task_alloc( ) in copy_process( ); prepare_kernel_cred( ), commit_creds( ), copy_creds( ), and/or put_cred_rcu( ). Compared to a VMI approach as described with respect to FIG. 1, the VAS approach allows management tasks to be done from within the inside of the guest with less performance overhead.

The VAS agent 212 may have a hypercall interface that allows the kernel of the guest OS 209 to access the process credential protection features. For instance, the following are hypercalls that may be used: configure, register_initial_task, assign, assign_privileged, commit, release, verification, and/or log. The configure hypercall is the first hypercall that gets invoked by the guest OS 209. It announces the in-guest memory region that is reserved for a key that is populated and protected by the virtualization system and used when creating a tag. The register_initial_task hypercall registers the first (statically configured) credentials of the first kernel thread swapper. This occurs next after the configure hypercall. The assign hypercall is responsible for announcing credentials that have been assigned to a task but not yet committed. In an embodiment, the assign hypercall is connected to the in-guest function security_task_alloc( ) in copy_process( ). The assign_privileged hypercall is when credentials are copied from another task that is privileged. In an embodiment, the assign_privileged hypercall is connected with the in-guest function prepare_kernel_cred( ). The commit hypercall is for when credentials are committed. In an embodiment, the commit hypercall is connected with the in-guest function commit_creds( ). The release hypercall is for releasing previously assigned/committed credentials. In an embodiment, the release hypercall is connected with the in-guest function put_cred_rcu( ). The verification hypercall is for verifying the integrity of the credentials. In an embodiment, the verification hypercall is connected with the in-guest function security_task_alloc( ) and is for verifying the integrity of the credentials of the parent process that is about to instantiate a child process. The log hypercall is for logging events. The log hypercall may be called when the integrity of credentials has been compromised.

The VAS module 214 creates process credential events for the process credential protection module 114 to process. These events are similar to the events created by the VMI hyper-process 116 and may include an initial task event, a credential assign event, a credential assign privileged event, a credential commit event, a credential release event, and/or a credential verification event. The initial task event is for the first (statically configured) credentials for the first kernel thread swapper. The credential assign event is for credentials that have been assigned to a task but not yet committed. The credential assign privileged event is for credentials that have been copied from another privileged task. The credential commit event is for when a task commits to a set of credentials. The credential release event is for releasing previously assigned/committed credentials. The credential verification event is for verifying the integrity of the credentials.

The VAS module 214 may create a tag that may be a hash value or an HMAC value created from at least part of the credential structure (e.g., sensitive data fields of the cred that do not include the maintenance fields and otherwise are not subject to change), the context in which the credentials reside (e.g., the address of the struct task_struct object belonging to a specific thread to which the credentials are or will be bound), the address of the new credentials structure (e.g., the address of the cred object), and if an HMAC value, a key or random value. The calculated tag may be included in the event transmitted to the process credential protection module 114. This tag allows the process credential protection module 114 to verify the tag upon selective verification point(s) throughout the lifetime of the credentials.

A credential event may include information about the in-guest credential object. For example, the following may be included for a credential commit event (corresponding to the function commit_creds( )), a credential assign privileged event (corresponding to the function prepare_kernel_cred( )), and a credential verification event (corresponding to the function security_task_alloc( ) that occurs during a fork system call: the address of the cred object, the context in which the credentials reside (represented by the address of the struct task_struct object belonging to a specific thread to which the credentials are or will be bound), and the tag associated with the credentials. As another example, the following may be included for a credential assign event (corresponding to the function copy_creds( )): the address of the cred object of the child, the child context in which the credentials reside (represented by the address of the struct task_struct object belonging to a specific thread to which the credentials are or will be bound), and the tag associated with the child credentials, the address of the cred object of the parent, and the parent context (represented by the address of the struct task_struct object of the parent). In a VAS implementation like that of FIG. 2, the data for the event is passed as hypercall arguments.

Although FIGS. 1 and 2 show a single guest operating system, there may be multiple guest operating systems running on top of multiple virtual machines.

Figure 3:
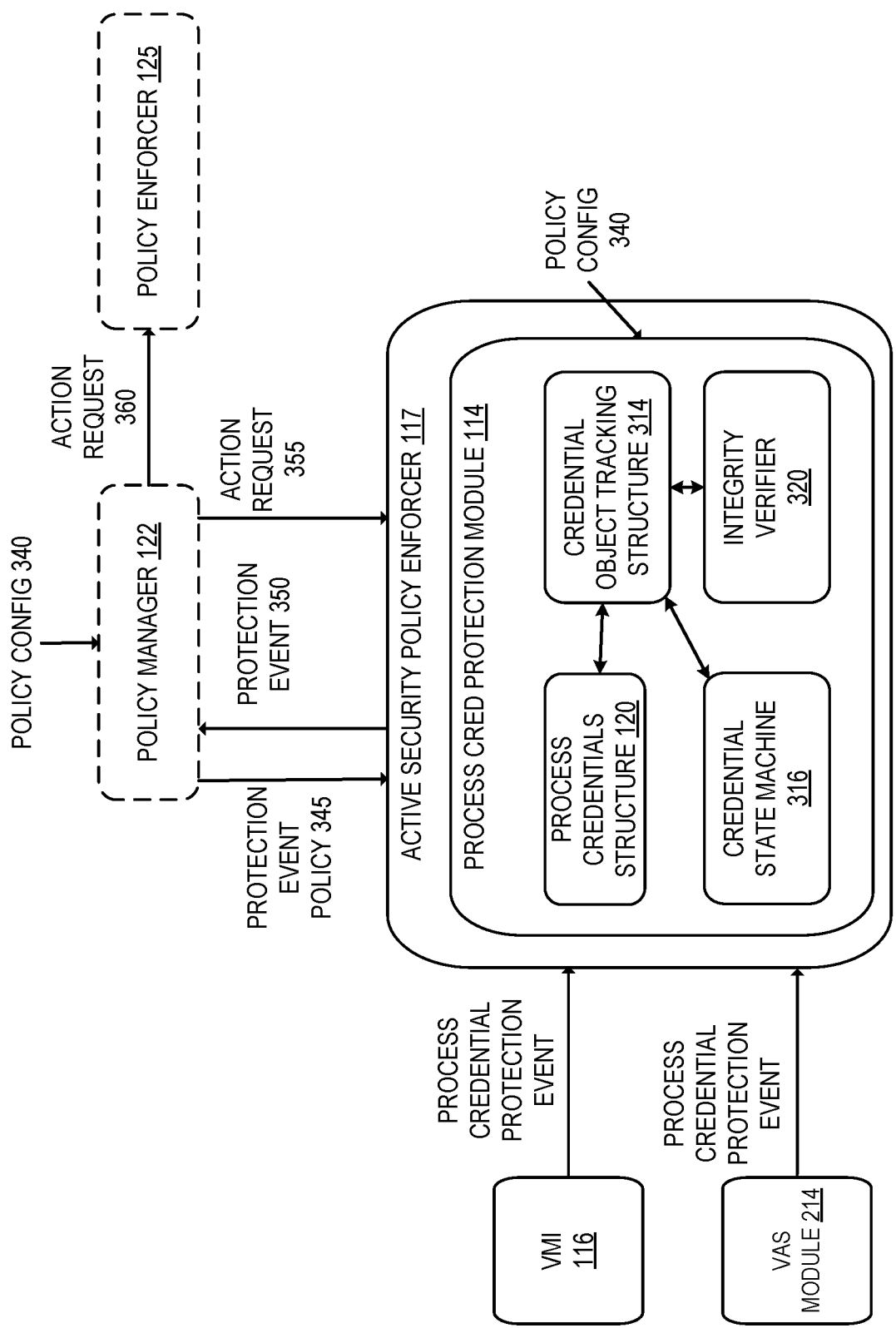
FIG. 3 is a block diagram that illustrates the process credential protection module in more detail according to an embodiment.

FIG. 3 is a block diagram that illustrates the process credential protection module 114 in more detail according to an embodiment. The process credential protection module 114 includes the process credentials structure 120, the credential object tracking structure 314, the credential state machine 316, and the integrity verifier 320. The process credential protection module 114 receives credential events from the VMI component 116 or the VAS module 214 depending on the embodiment.

After receiving an event that indicates a new process credential structure is allocated in-guest, the process credential protection module 114 allocates a new process credentials structure 120 that corresponds with the in-guest structure, if one does not already exist. In the case of Linux, these events correspond to the functions prepare_kernel_cred( ) and copy_creds( ), and may include commit_creds( ). Until the in-guest credential that is to be tracked is assigned to the allocated object, the allocated object holds the invalid state.

The process credential protection module 114 may create or update a credential object tracking structure 314, which may be in the form of a hash table. The credential object tracking structure 314, shown in more detail in FIG. 4, includes the guest address of the cred 410, the context 412 in which the credentials reside (e.g., the guest address of the struct task_struct object belonging to a specific thread to which the credentials are or will be bound), the created tag 414, and the current state 416.

Figure 5:
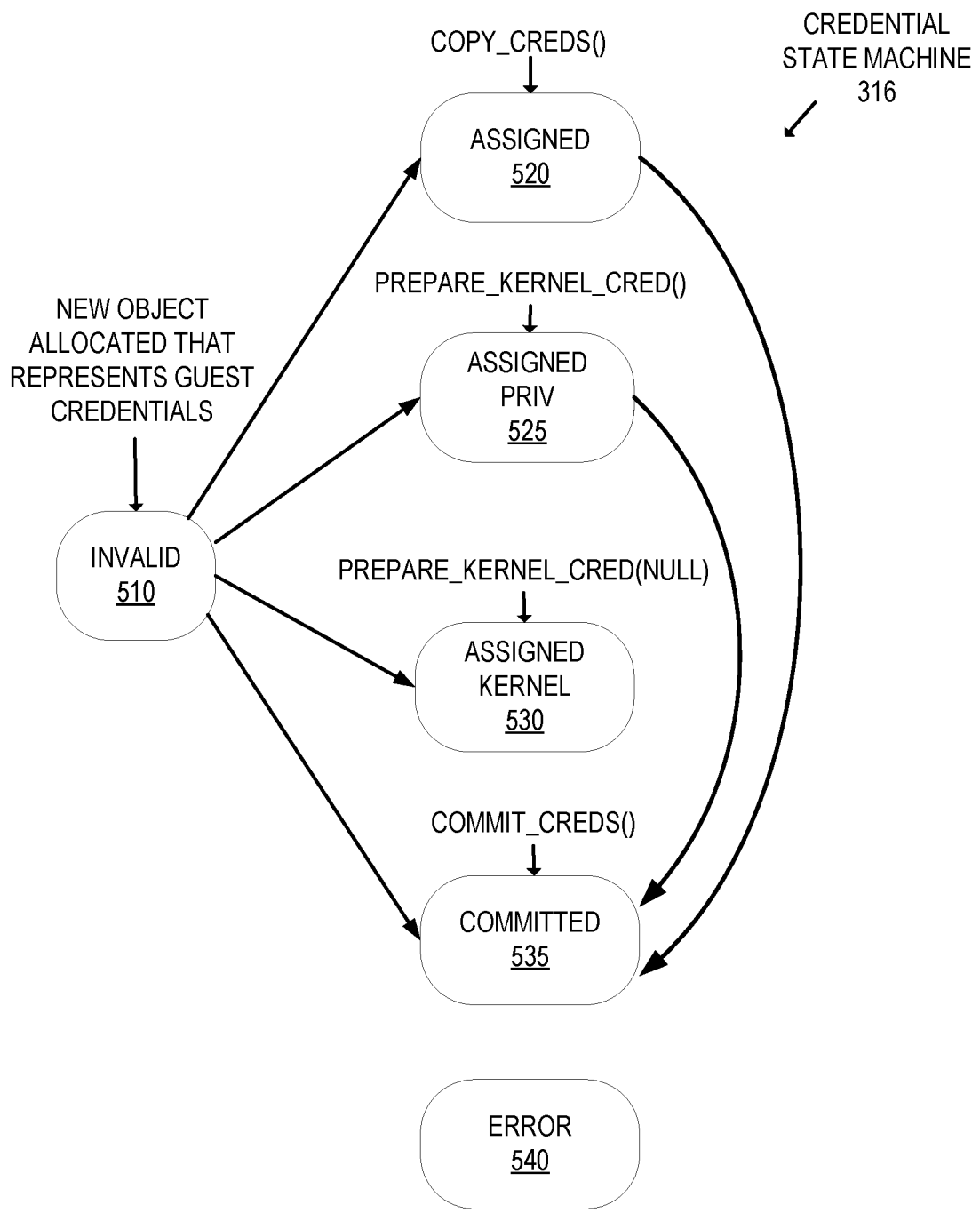
FIG. 5 shows an exemplary credential state machine according to an embodiment.

The process credential protection module 114 tracks the lifecycle of the tracked credential objects in the form of a credential state machine 316 and blocks or alerts upon transition violations. FIG. 5 shows an exemplary credential state machine 316 according to an embodiment. The states include: invalid state 510, assigned state 520, assigned_privileged state 525, assigned_kernel state 530, committed state 535, and error state 540. The invalid state 510 represents the default state of the new credential object and is used when allocating a new object representing credentials. An allocated credential structure object holds the invalid state until the corresponding in-guest credential that is to be tracked is assigned to that allocated object. The assigned state 520 represents when credentials have been assigned to and not yet committed by a task. In an embodiment, a credential object is put into the assigned state 520 upon the Linux kernel function "copy_creds" being called. The assigned_privileged state 525 represents when the credentials of a privileged task (e.g., a kernel thread) have been copied and not yet committed by a task. In an embodiment, a credential object is put into the assigned_privileged state 525 upon the Linux kernel function "prepare_kernel_cred( )" with a valid struct task_struct as argument being called. The assigned_kernel state 530 represents when the credentials of a privileged task are copied of the kernel_init task swapper. In an embodiment, a credential object is put into the assigned_kernel state 530 upon the Linux kernel function "prepare_kernel_cred( )" with a null argument being called. The committed state 535 represents when the credentials have been committed. In an embodiment, a credential object is put into the committed state 535 upon the Linux kernel function "commit_creds( )" being called. The error state 540 represents when there has been a violation of a state transition and/or when the integrity of the credential object is compromised.

The process credential protection module 114 tracks the state transitions and may block and/or alert upon a state transition that is not allowed. In an embodiment, the following state transitions are allowed (and all others are not allowed): invalid state 510 to assigned state 520; invalid state 510 to assigned_privileged state 525; invalid state 510 to assigned_kernel state 530; invalid state 510 to committed state 535; assigned state 520 to committed state 535; and assigned_privileged state 525 to committed state 535.

In an embodiment, the integrity verifier 320 of the process credential protection module 114 checks the integrity of the credential object using the stored tag value. For instance, at a verification point, the process credential protection module compares the tag value included in the process credential protection event with the stored tag value. These values will be the same if the credential object has not been modified. If the credential object has been modified, then these values will be different. If these values are not the same, the process credential protection module may cause remedial action to be taken (e.g., block the action and/or log/alert of the violation). In an embodiment, a verification point is performed at the Linux kernel function "security_task_alloc( )" that occurs during a "fork" system call. Other verification points may be performed at other LSM hooks (e.g., upon certain system calls).

FIG. 3 also shows the interaction between the policy manager 122 and the process credential protection module 114. As noted elsewhere, the policy manager 122 is optional. The policy manager 122 receives policy configuration 340. The received policy configuration 340 can be received from local configuration (e.g., through an API, command line interface (CLI), etc.) or received remotely. The received policy configuration 340 is for a process credential protection policy and may define the action that is taken when encountering a credential-related corruption during a verification point (e.g., log, notify, and/or block) and/or during an invalid state transition (e.g., log, notify, and/or block). The received policy configuration 340 may define the verification points to be performed. In lieu of the policy manager 122, the process credential protection module 114 may receive the policy configuration 340.

In some embodiments, the policy manager 122 pushes a new or updated policy to the determined policy enforcer by sending an update policy action to that policy enforcer. The policy manager 122 can also revoke a policy associated with a specific policy enforcer by sending an update policy action to that policy enforcer. As represented in FIG. 3, the policy manager 122 pushes a process credential protection event policy 345 to the active security policy enforcer 117. These policies include the action requested (e.g., to install or update a policy) and may include one or more parameters to specify how to execute the action (e.g., the verification points, etc.). The process credential protection module 114 installs the process credential protection policy.

In an embodiment, upon determining that a process credential protection event has occurred (e.g., an invalid state transition, a failed integrity check), the active security policy enforcer 117 through the process credential protection module 114 transmits the process credential protection event 350 to the policy manager 122. The policy manager 122 may determine if the policy has been violated and what action(s) to take. The policy manager 122 may transmit action requests to policy enforcers, such as after an event has been detected in the system. For example, the action request 355 may be sent to the active security policy enforcer 117 to be taken and the action request 360 may be sent to the policy enforcer 125. The action request is a synchronous request and includes the action requested and may include one or more parameters to specify how to execute the action. For example, a Kill Task action may include a process identifier (pid) parameter that specifies which task to terminate. Depending on the particular action, action requests can be sent to the policy enforcer 125 and/or be carried out by the policy manager 122 itself. For instance, a log event action request may be performed by the policy manager 122 itself. Policy enforcers accept action requests and perform the requested actions.

Figure 6:
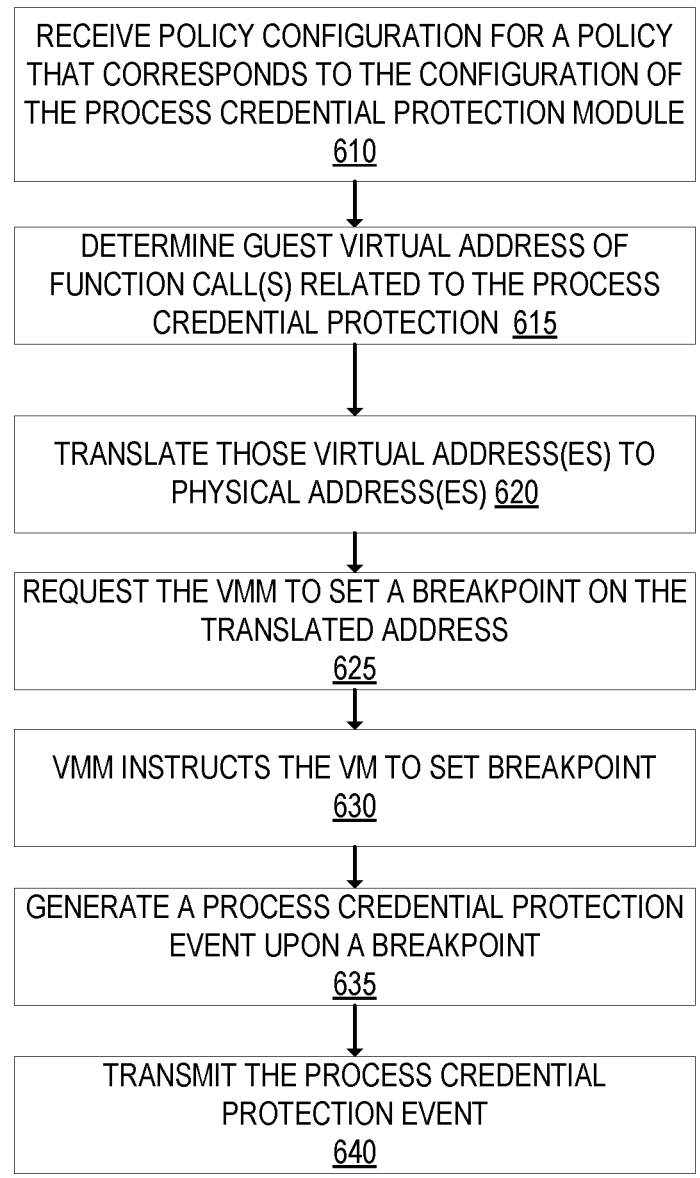
FIG. 6 is a flow diagram that illustrates exemplary operations for process credential protection according to an embodiment.

FIG. 6 is a flow diagram that illustrates exemplary operations for process credential protection according to an embodiment. The operations of FIG. 6 are described with the exemplary embodiment of FIG. 1. However, the operations of FIG. 6 can be performed by embodiments different from that of FIG. 1, and the embodiment of FIG. 1 can perform operations different from the operations of FIG. 6.

At operation 610, the active security policy enforcer 117 receives a policy configuration for a policy that corresponds to the configuration of the process credential protection module 114. In an embodiment, this policy configuration is received from the policy manager 122 or directly to the active security policy enforcer 117. The received configuration may be received from a user or administrator of the computing device 100, and the received configuration may be received locally or remotely. The received configuration may specify function call(s) related to the process credential protection. The received configuration may define the action to take upon a process credential protection policy violation (e.g., log, alert, and/or block) and it may specify the verification points.

Next, at operation 615, the active security policy enforcer 117 determines the guest virtual address of the function call(s) related to the process credential protection. For instance, these function calls may include: prepare_kernel_cred( ), copy_creds( ), commit_creds( ), put_cred_rcu( ), and/or security_task_alloc( ). For example, the semantic library may be consulted for the location of these function(s) in the guest OS. After locating the guest virtual address(es), at operation 620, those virtual address(es) are translated to physical address(es). For instance, the virtual address of the prepare_kernel_cred function is translated into a physical address. Next, at operation 625, the active security policy enforcer 117 requests the VMM 115 to set a breakpoint trap on the translated physical address(es). Next, at operation 630, the VMM 115 instructs the corresponding VM 108 to set the breakpoints within the guest OS 109.

When a breakpoint is hit (e.g., the prepare_kernel_cred function in the guest OS 109 is called), the VMM 115 generates an event at operation 635. Generating the event may include generating a tag, which may be a hash value or an HMAC value computed from at least part of the credential structure (e.g., sensitive data fields of the cred that do not include the maintenance fields and otherwise not subject to change), the context in which the credentials reside (e.g., the address of the struct task_struct object belonging to a specific thread to which the credentials are or will be bound), the address of the new credentials structure (e.g., the address of the cred object), and if an HMAC value, a key or random value. The calculated tag may be included in the event transmitted to the process credential protection module 114.

The credential event may include information about the in-guest credential object. For example, the following may be included for a credential commit event (corresponding to the function commit_creds( )), a credential assign privileged event (corresponding to the function prepare_kernel_cred( )), and a credential verification event (corresponding to the function security_task_alloc( ) that occurs during a fork system call: the address of the cred object, the context in which the credentials reside (represented by the address of the struct task_struct object belonging to a specific thread to which the credentials are or will be bound), and the tag associated with the credentials. As another example, the following may be included for a credential assign event (corresponding to the function copy_creds( )): the address of the cred object of the child, the child context in which the credentials reside (represented by the address of the struct task_struct object belonging to a specific thread to which the credentials are or will be bound), and the tag associated with the child credentials, the address of the cred object of the parent, and the parent context (represented by the address of the struct task_struct object of the parent).

The event is communicated to the process credential protection module 114 at operation 640.

Figure 7:
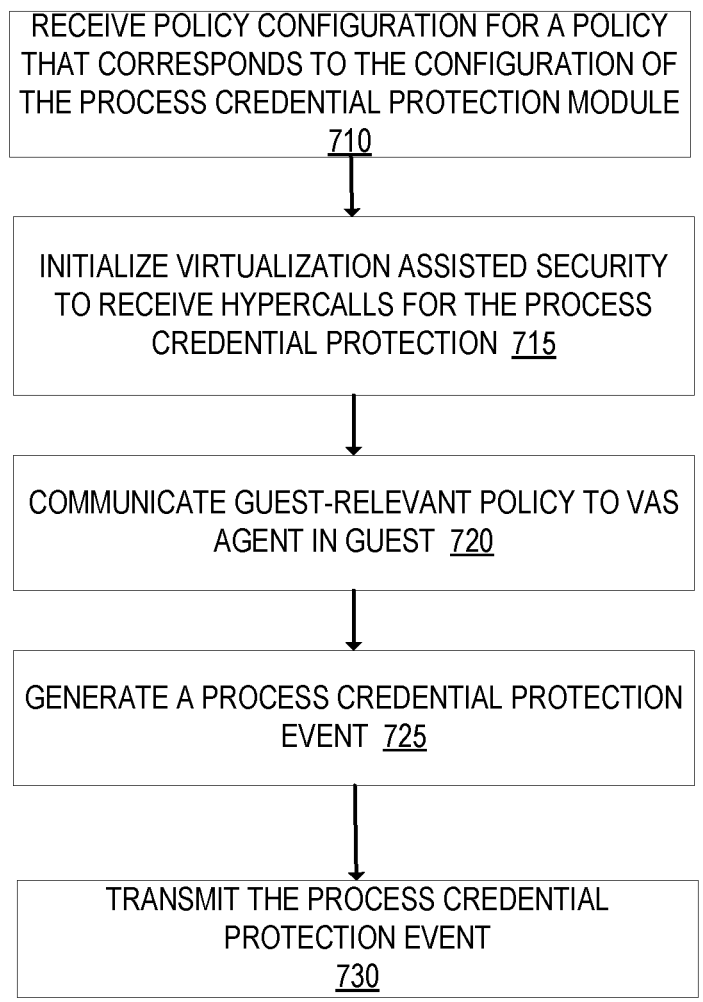
FIG. 7 is a flow diagram that illustrates exemplary operations for process credential protection according to an embodiment.

FIG. 7 is a flow diagram that illustrates exemplary operations for process credential protection according to an embodiment. The operations of FIG. 7 are described with the exemplary embodiment of FIG. 2. However, the operations of FIG. 7 can be performed by embodiments different from that of FIG. 2, and the embodiment of FIG. 2 can perform operations different from the operations of FIG. 7.

At operation 710, the active security policy enforcer 117 receives a policy configuration for a policy that corresponds to the configuration of the process credential protection module 114. In an embodiment, this policy configuration is received from the policy manager 122 or directly to the active security policy enforcer 117. The received configuration may specify function call(s) related to the process credential protection. The received configuration may be received from a user or administrator of the computing device 200, and the received configuration may be received locally or remotely. The received configuration may define the action to take upon a process credential protection policy violation (e.g., log, alert, and/or block) and it may specify the verification points.

Next, at operation 715, the active security policy enforcer 117 initializes the virtualization assisted security (VAS) module 214 to receive hypercalls for the process credential protection. The hypercalls that may be used include: configure, register_initial_task, assign, assign_privileged, commit, release, verification, and/or log, as described elsewhere. Next, at operation 720, the VAS module 214 communicates guest-relevant policy to the VAS agent 212 in the guest OS 209. The guest-relevant policy may define the function(s) and/or points in the guest OS 209 to call into the VAS module 214. For instance, the configure hypercall is the first hypercall that gets invoked by the guest OS 209. It announces the in-guest memory region that is reserved for a key that is populated and protected by the virtualization system and used when creating a tag (if using HMAC). The register_initial_task hypercall registers the first (statically configured) credentials of the first kernel thread swapper. This occurs next after the configure hypercall. The assign hypercall is responsible for announcing credentials that have been assigned to a task but not yet committed. In an embodiment, the assign hypercall is connected to the in-guest function security_task_alloc( ) in copy_process( ). The assign_privileged hypercall is when credentials are copied from another task that is privileged. In an embodiment, the assign_privileged hypercall is connected with the in-guest function prepare_kernel_cred( ). The commit hypercall is for when credentials are committed. In an embodiment, the commit hypercall is connected with the in-guest function commit_creds( ). The release hypercall is for releasing previously assigned/committed credentials. In an embodiment, the release hypercall is connected with the in-guest function put_cred_rcu( ). The verification hypercall is for verifying the integrity of the credentials. In an embodiment, the verification hypercall is connected with the in-guest function security_task_alloc( ) and is for verifying the integrity of the credentials of the parent process that is about to instantiate a child process. The log hypercall is for logging events. The log hypercall may be called when the integrity of credentials has been compromised.

When a defined function or other place in the code is hit (e.g., the prepare_kernel_cred function in the guest OS 109 is called), the VAS agent 212 makes the corresponding hypercall to the VAS module 214. The VAS module 214 generates a corresponding process credential protection event at operation 725. Generating the event may include generating a tag, which may be a hash value or an HMAC value computed from at least part of the credential structure (e.g., sensitive data fields of the cred that do not include the maintenance fields and otherwise not subject to change), the context in which the credentials reside (e.g., the address of the struct task_struct object belonging to a specific thread to which the credentials are or will be bound), the address of the new credentials structure (e.g., the address of the cred object), and if an HMAC value, a key or random value. The calculated tag may be included in the event transmitted to the process credential protection module 114.

The credential event may include information about the in-guest credential object. For example, the following may be included for a credential commit event (corresponding to the function commit_creds( )), a credential assign privileged event (corresponding to the function prepare_kernel_cred( )), and a credential verification event (corresponding to the function security_task_alloc( ) that occurs during a fork system call: the address of the cred object, the context in which the credentials reside (represented by the address of the struct task_struct object belonging to a specific thread to which the credentials are or will be bound), and the tag associated with the credentials. As another example, the following may be included for a credential assign event (corresponding to the function copy_creds( )): the address of the cred object of the child, the child context in which the credentials reside (represented by the address of the struct task_struct object belonging to a specific thread to which the credentials are or will be bound), and the tag associated with the child credentials, the address of the cred object of the parent, and the parent context (represented by the address of the struct task_struct object of the parent).

The event is communicated to the process credential protection module 114 at operation 730

Figure 8:
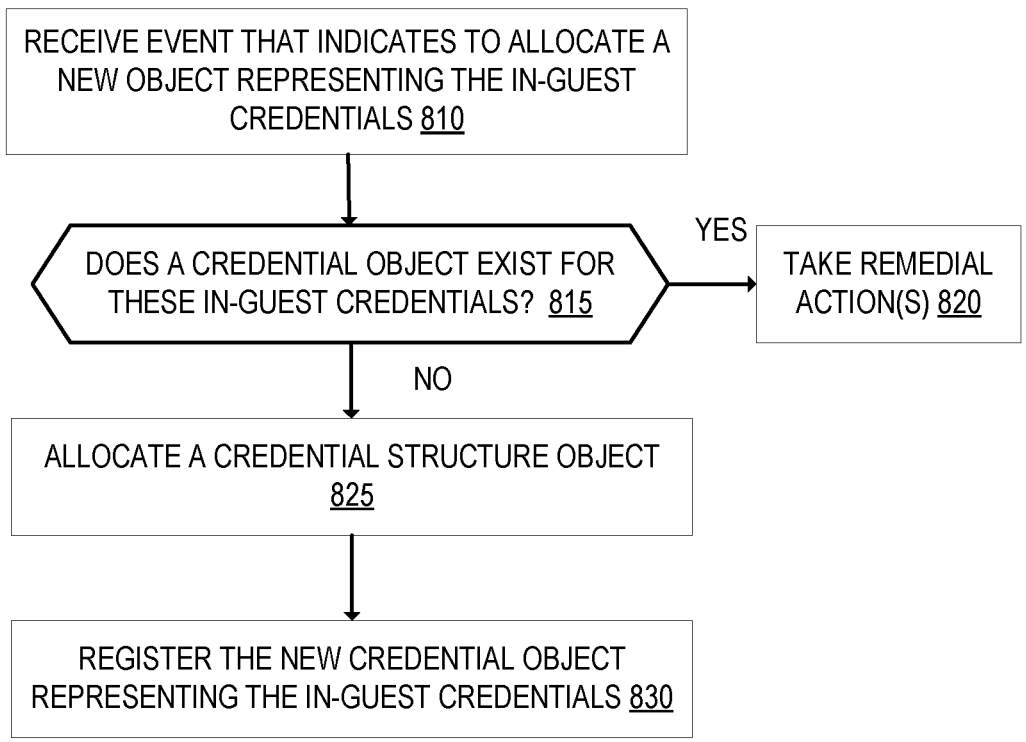
FIG. 8 is a flow diagram that illustrates exemplary operations for processing a process credential protection event according to an embodiment.

FIG. 8 is a flow diagram that illustrates exemplary operations for processing a process credential protection event according to an embodiment. The operations of FIG. 8 are described with the exemplary embodiment of FIG. 3. However, the operations of FIG. 8 can be performed by embodiments different from that of FIG. 3, and the embodiment of FIG. 3 can perform operations different from the operations of FIG. 8.

At operation 810, the process credential protection module 114 receives a process credential protection event that indicates to allocate a new object representing the in-guest credentials. This event may be received from the VMI 116 or the VAS module 214 depending on the implementation of the computing device. This event may be a credential assign event or a credential assign privileged event. This event may, in some circumstances, be a credential commit event. The credential assign event may be generated responsive to the function security_task_alloc( ) in copy_process( ) being called. The credential assign privileged event may be generated responsive to the function prepare_kernel_cred( ) being called. The credential commit event may be generated responsive to the function commit_creds( ) being called.

If the event is a credential assign event, the event may include the following information: the address of the cred object of the child, the child context in which the credentials reside (represented by the address of the struct task_struct object belonging to a specific thread to which the credentials are or will be bound), and the tag associated with the child credentials, the address of the cred object of the parent, and the parent context (represented by the address of the struct task_struct object of the parent). If the event is a credential assign privileged event or a credential commit event, the event may include the following information: the address of the cred object, the context in which the credentials reside (represented by the address of the struct task_struct object belonging to a specific thread to which the credentials are or will be bound), and the tag associated with the credentials.

In a VMI implementation like that of FIG. 1, the data for the event is gathered by directly reading guest data structures from the host (e.g., directly reading the guest's physical memory). In a VAS implementation like that of FIG. 2, the data for the event is passed as hypercall arguments.

Next, at operation 815, the process credential protection module 114 determines whether a credential object exists for these in-guest credentials. For example, the process credential protection module 114 accesses the credential object tracking structure 314 to determine whether a credential object already exists for the address of the cred. If one does, then at operation 820 the process credential protection module 114 takes one or more remedial actions (e.g., log, alert, and/or block). The state may also be updated to the error state. If a credential object does not exist for these in-guest credentials, then at operation 825 the process credential protection module 114 allocates a new process credentials structure 120 (e.g., a cred object) that mirrors the process credentials structure 110 of the guest. Until the in-guest credential that is to be tracked is assigned to the allocated object, the allocated object holds the invalid state.

Next, at operation 830, the process credential protection module 114 registers the new credential structure object representing the in-guest credentials. As part of registering, the process credential protection module 114 binds the process credentials to: the subjective credentials (e.g., represented by the address of the struct cred instance), the context in which the credentials reside (e.g., represented by the address of the struct task_struct instance, and at least part of the content of the cred instance. As part of registering, the process credential protection module 114 may create or update the credential object tracking structure 314 including the tag included in the event and the new state for the object. For instance, if the event is generated responsive to the function security_task_alloc( ) in copy_process being called, the state is updated to the assigned state. As another example, if the event is generated responsive to the function prepare_kernel_cred( ) with a valid struct task_struct as argument being called, the state is updated to the assigned_privileged state. As another example, if the event is generated responsive to the function prepare_kernel_cred( ) with a null argument being called, the state is updated to the assigned_kernel state.

Figure 9:
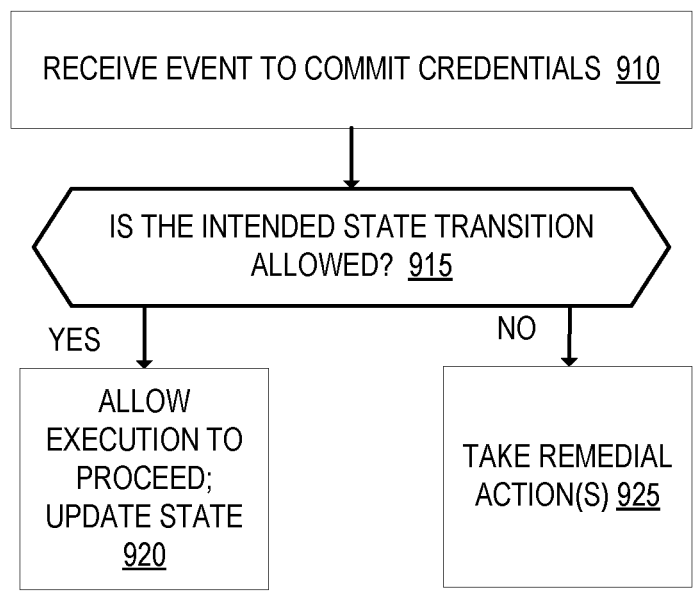
FIG. 9 is a flow diagram that illustrates exemplary operations for processing a process credential protection event to commit credentials according to an embodiment.

FIG. 9 is a flow diagram that illustrates exemplary operations for processing a process credential protection event to commit credentials according to an embodiment. The operations of FIG. 9 are described with the exemplary embodiment of FIG. 3. However, the operations of FIG. 9 can be performed by embodiments different from that of FIG. 3, and the embodiment of FIG. 3 can perform operations different from the operations of FIG. 9.

At operation 910, the process credential protection module 114 receives a process credential protection event that indicates to commit credentials. This event may be received from the VMI 116 or the VAS module 214 depending on the implementation of the computing device. This event may be a credential commit event. The credential commit event may be generated responsive to the function commit_creds( ) being called. The credential commit event may include the following information: the address of the cred object, the context in which the credentials reside (represented by the address of the struct task_struct object belonging to a specific thread to which the credentials are or will be bound), and the tag associated with the credentials.

Next, at operation 915, the process credential protection module 114 determines whether the intended state transition is allowed, which in this case is the committed state. The process credential protection module 114 accesses the credential object tracking structure 314 to determine the current state of the credential object corresponding to the received event. As shown in FIG. 5, a valid state transition exists for the invalid state to the committed state, the assigned state to the committed state, and the assigned_privileged state to the committed state. A transition from the assigned_kernel state to the committed state is not allowed. If the state transition is allowed, then execution proceeds and the state is updated in the credential object tracking structure 314 at operation 920. If the state transition is not allowed, then one or more remedial actions are taken at operation 925. The commit cred(s) may not be allowed to fail. In such a case, the remedial action may include logging, alerting, and/or updating the state in the credential object tracking structure 314 to the error state. Further integrity verification may cause the task to be blocked or killed when in the error state.

Figure 10:
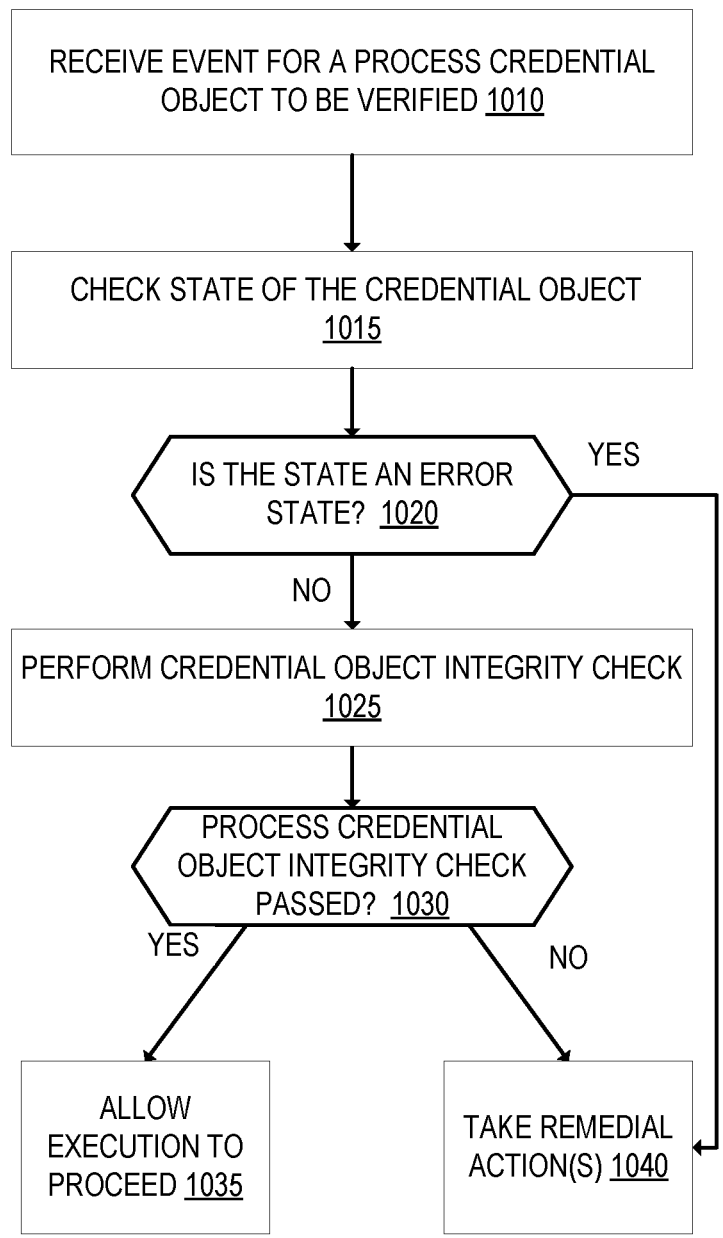
FIG. 10 is a flow diagram that illustrates exemplary operations for processing a process credential protection event to verify credential integrity according to an embodiment.

FIG. 10 is a flow diagram that illustrates exemplary operations for processing a process credential protection event to verify credential integrity according to an embodiment. The operations of FIG. 10 are described with the exemplary embodiment of FIG. 3.

However, the operations of FIG. 10 can be performed by embodiments different from that of FIG. 3, and the embodiment of FIG. 3 can perform operations different from the operations of FIG. 10.

At operation 1010, the process credential protection module 114 receives a process credential protection event that indicates to verify credential integrity. This event may be received from the VMI 116 or the VAS module 214 depending on the implementation of the computing device. This event may be a credential verification event. The credential verification event may be generated response to the function security_task_alloc( ) that occurs during a fork system call being called. A credential verification event may be generated from other verification points at other LSM hooks (e.g., upon certain system calls). The credential verification event may include the following information: the address of the cred object, the context in which the credentials reside (represented by the address of the struct task_struct object belonging to a specific thread to which the credentials are or will be bound), and the tag associated with the credentials.

At operation 1015, the process credential protection module 114 checks the state of the credential object. For example, the process credential protection module 114 accesses the credential object tracking structure 314 to determine the current state of the credential object corresponding to the received event. If the current state is an error state, as determined in operation 1020, then operation 1040 is performed where one or more remedial actions are taken (e.g., the task is killed, the task is blocked, the error is logged and/or alerted). If the current state is not an error state, then operation 1025 is performed.

At operation 1025, the process credential protection module 114 performs a credential object integrity check. For example, the process credential protection module 114 use compares the tag value included in the vent with the tag value for the credential object stored in the credential object tracking structure 314. These values will be the same if the credential object has not been modified. If the credential object has been modified, then these values will be different. If the process credential object integrity check has passed, as determined in operation 1030 (e.g., the tag in the event is the same as the stored tag), then the process credential protection module 114 allows the execution to proceed at operation 1035. If the process credential object integrity check has failed (e.g., the tag values are not the same), the process credential protection module 114 causes remedial action(s) to be taken at operation 1025 (e.g., block the action and/or log/alert of the violation).

The exemplary architecture shown in FIGS. 1 and 2 can be used in different hardware architectures including ARM architectures and x86 architectures. ARM defines different levels of privilege as exception levels. Each exception level is numbered, and the higher levels of privilege have higher numbers. Exception level 0 (EL0) is known as the application privilege level. All the hypervisor components except for the microkernel 160 are in the exception level 0. Applications executing within the virtual machines are also in exception level 0. The OS kernels executing within the virtual machines are in exception level 1 (EL1), which is the rich OS exception level. The microkernel 160 is in exception level 2 (EL2), which is the hypervisor privilege level. The firmware 178 and the hardware 180 are at exception level 3 (EL3), which is the firmware privilege level and the highest privilege level. The x86 architecture defines four protection rings but most modern architectures use two privilege levels, rings 0 and 3 and may run in guest or host mode. For instance, a guest OS kernel running in a virtual machine runs in the most privileged level (guest kernel mode, ring 0), and the guest applications run in a lesser privileged level (guest user mode, ring 3). The microkernel 160 runs in the most privileged level of the host (host kernel mode, ring 0), and the other components of the hypervisor run in a lesser privileged level (host user mode, ring 3).

Figure 11:
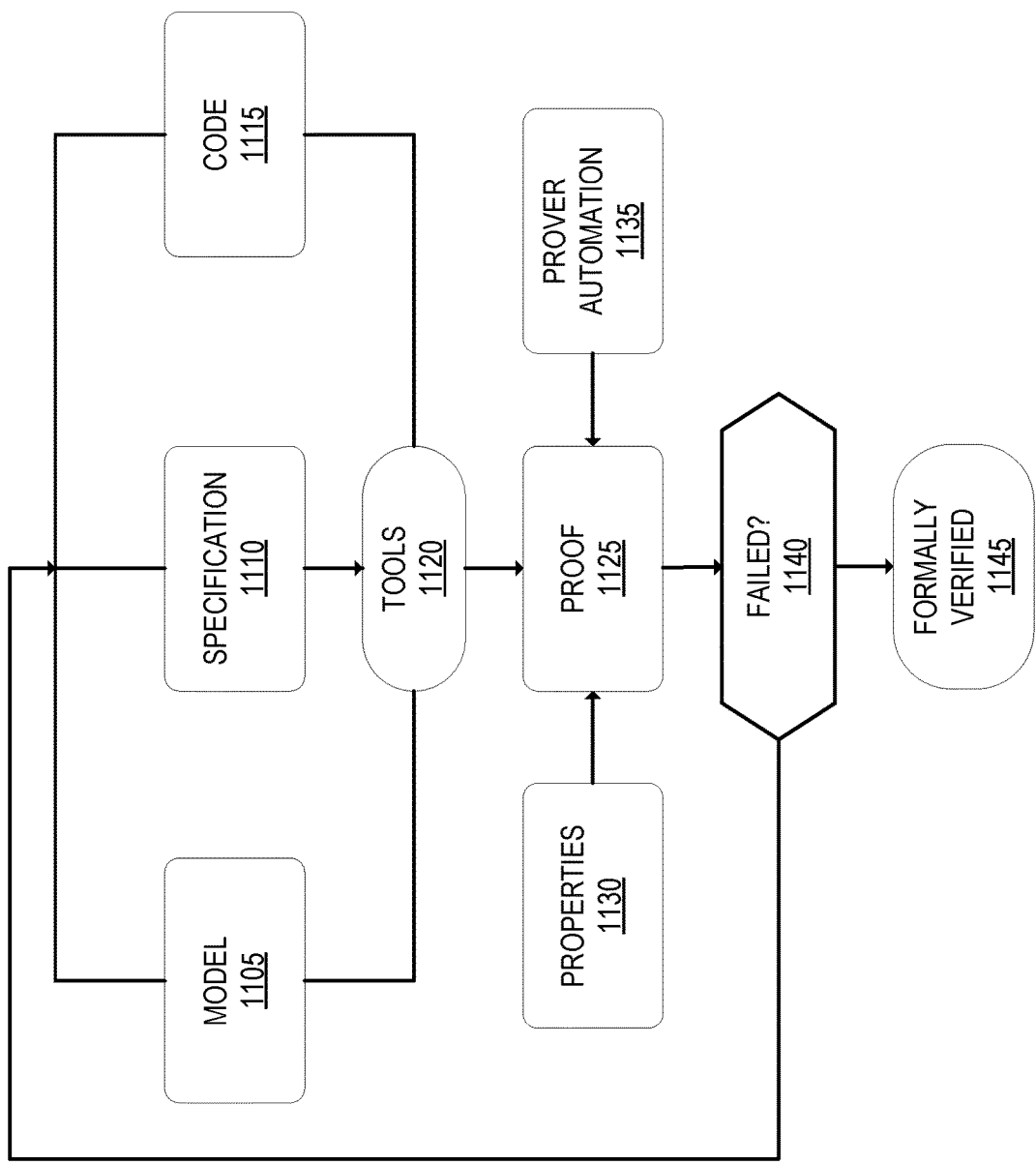
FIG. 11 is a flow chart that illustrates an exemplary method of formal verification that may be used in some embodiments.

Multiple components of the virtualization layer are formally verified components in some embodiments. Formal verification proves (or disproves) the correctness of intended code using formal methods of mathematics. Formal verification guarantees that a system is free of programming errors. FIG. 11 is a flow chart that illustrates an exemplary method of formal verification that may be used in some embodiments. A model 1105 of the code 1115 is created. The model 1105 is the functional implementation corresponding to the code 1115. The specification 1110 is a formal specification of the properties of the code 1115 expressed in a mathematical language. The code 1115 itself may be coded in a way that is architecture to be formally verified. The tools 1120 may include tools for converting the code 1115 into file(s) suitable for an interactive theorem prover 1135. The properties 1130 include any security properties or any theorems used for proving the code 1115. If the proof 1125 fails at block 1140, then the code 1115 is not formally verified. If the proof is verified, then the code 1115 is deemed to be formally verified 1145.

While embodiments have described the tag being generated by the VMI or VAS components, in another embodiment the tag is generated by the process credential protection module 114. In such an embodiment, the event information received from the VMI or VAS components include the data necessary to create the tag including the values of the cred object.

The techniques shown in the figures can be implemented using code and data stored and executed on one or more computing devices. Such computing devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such computing devices typically include a set of one or more hardware processors coupled to one or more other components, such as one or more I/O devices (e.g., storage devices (non-transitory machine-readable storage media), a keyboard, a touchscreen, a display, and/or network connections). The coupling of the set of processors and other components is typically through one or more busses and bridges (also termed as bus controllers). Thus, the storage device of a given computing device typically stores code and/or data for execution on the set of one or more processors of that computing device.

In the preceding description, numerous specific details are set forth to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A non-transitory machine-readable storage medium that stores instructions that, when executed by a processor, causes operations to be performed including:
    registering, by a process credential protection module provided in a hypervisor in a virtualized system, in-guest process credentials of a guest operating system including binding the process credentials with values including: a guest address of a first structure that includes subjective credentials, a guest address of a second structure that includes a context in which the process credentials reside, and a plurality of data fields of the first structure that are not subject to change;
    creating a first tag from at least the values bound with the process credentials;
    storing the first tag in a tracking structure of the process credential protection module;
    performing, by the process credential protection module, an integrity verification check at one or more verification points, wherein each verification point is triggered by a function or system call being called by the guest operating system, and wherein performing the integrity verification check includes creating a second tag from at least the values bound with the process credentials; and
    determining that the second tag does not match the first tag thereby indicating that the integrity of the in-guest process credentials has been compromised, and responsive to this determination, taking one or more remedial actions.

2. The non-transitory machine-readable storage medium of claim 1, wherein the first structure that includes subjective credentials is a cred object, and wherein the second structure is a task_struct object.

3. The non-transitory machine-readable storage medium of claim 1, wherein registering is performed responsive to detecting that the guest operating system called a prepare_kernel_cred( ) function or a copy_creds( ) function.

4. The non-transitory machine-readable storage medium of claim 1, wherein registering is performed responsive to detecting that the guest operating system called a commit_creds( ) function.

5. The non-transitory machine-readable storage medium of claim 1, wherein the first tag and the second tag are hash values or Hash-based Message Authentication Code (HMAC) values.

6. The non-transitory machine-readable storage medium of claim 1, wherein the one or more verification points are triggered by a security_task_alloc( ) function occurring during a fork system call.

7. The non-transitory machine-readable storage medium of claim 1, wherein the operations further include:
    tracking state transitions of the in-guest process credentials in a state machine; and
    taking one or more remedial actions responsive to determining that an invalid state transition has occurred.

8. The non-transitory machine-readable storage medium of claim 7,
    wherein states of the state machine include:
        an assigned state that is associated with a copy_creds( ) function being called by the guest operating system,
        an assigned privileged state that is associated with a prepare_kernel_cred( ) function with a valid task_struct argument being called by the guest operating system,
        an assigned kernel state that is associated with a prepare_kernel_cred( ) function with a null argument being called by the guest operating system, and
        a committed state that is associated with a commit_creds( ) function being called by the guest operating system;
    wherein valid state transitions include:
        the assigned state to the committed state, and
        the assigned privileged state to the committed state; and
    wherein the invalid state transition is a transition that is not one of the valid state transitions.

9. A method for process credential protection in a virtualized system, comprising:
    registering, by a process credential protection module provided in a hypervisor in the virtualized system, in-guest process credentials of a guest operating system including binding the process credentials with values including: a guest address of a first structure that includes subjective credentials, a guest address of a second structure that includes a context in which the process credentials reside, and a plurality of data fields of the first structure that are not subject to change;

creating a first tag from at least the values bound with the process credentials;

storing the first tag in a tracking structure of the process credential protection module;

performing, by the process credential protection module, an integrity verification check at one or more verification points, wherein each verification point is triggered by a function or system call being called by the guest operating system, and wherein performing the integrity verification check includes creating a second tag from at least the values bound with the process credentials; and determining that the second tag does not match the first tag thereby indicating that the integrity of the in-guest process credentials has been compromised, and responsive to this determination, taking one or more remedial actions.

10. The method of claim 9, wherein the first structure that includes subjective credentials is a cred object, and wherein the second structure is a task_struct object.

11. The method of claim 9, wherein registering is performed responsive to detecting that the guest operating system called a prepare_kernel_cred( ) function or a copy_creds( ) function.

12. The method of claim 9, wherein registering is performed responsive to detecting that the guest operating system called a commit_creds( ) function.

13. The method of claim 9, wherein the first tag and the second tag are hash values or Hash-based Message Authentication Code (HMAC) values.

14. The method of claim 9, wherein the one or more verification points are triggered by a security_task_alloc( ) function occurring during a fork system call.

15. The method of claim 9, further comprising:

tracking state transitions of the in-guest process credentials in a state machine; and taking one or more remedial actions responsive to determining that an invalid state transition has occurred.

16. The method of claim 15, wherein states of the state machine include:
an assigned state that is associated with a copy_creds( ) function being called by the guest operating system,
an assigned privileged state that is associated with a prepare_kernel_cred( ) function with a valid task_struct argument being called by the guest operating system,
an assigned kernel state that is associated with a prepare_kernel_cred( ) function with a null argument being called by the guest operating system, and
a committed state that is associated with a commit_creds( ) function being called by the guest operating system;

wherein valid state transitions include:
the assigned state to the committed state, and
the assigned privileged state to the committed state; and wherein the invalid state transition is a transition that is not one of the valid state transitions.

17. A non-transitory machine-readable storage medium that stores instructions that, when executed by a processor, causes operations to be performed including:

receiving, at a hyper-process running in a hypervisor, a first process credential protection event that indicates to allocate a new object representing in-guest credentials of a guest operating system, wherein the new object representing in-guest credentials is associated with a first tag that is created from at least part of an address of subjective credentials, an address of a context in which the in-guest credentials reside, and at least part of content of the in-guest credentials;

registering the new object representing in-guest credentials for tracking purposes including a current state;

receiving, at the hyper-process running in the hypervisor, a second process credential protection event that indicates to commit the in-guest credentials;

determining that a state transition to a committed state for the second process credential event is not permitted, and responsive to this determination, taking one or more remedial actions;

receiving, at the hyper-process running in the hypervisor, a third process credential protection event that indicates to verify integrity of the in-guest credentials, wherein the third process credential protection event is associated with a second tag that is created from at least part of the address of subjective credentials, the address of a context in which the in-guest credentials reside, and at least part of the content of the in-guest credentials; and determining that the first tag and the second tag do not match thereby indicating that the integrity of the in-guest credentials has been compromised, and responsive to this determination, taking one or more remedial actions.

18. The non-transitory machine-readable storage medium of claim 17, wherein the address of subjective credentials is an address of a cred object, and wherein the address of the context is an address of a task_struct object.

19. The non-transitory machine-readable storage medium of claim 17, wherein registering is performed responsive to detecting that the guest operating system called a prepare_kernel_cred( ) function or a copy_creds( ) function.

20. The non-transitory machine-readable storage medium of claim 17, wherein registering is performed responsive to detecting that the guest operating system called a commit_creds( ) function.

21. The non-transitory machine-readable storage medium of claim 17, wherein the first tag and the second tag are hash values or Hash-based Message Authentication Code (HMAC) values.

22. The non-transitory machine-readable storage medium of claim 17, wherein the third process credential protection event is received responsive to a security_task_alloc( ) function occurring during a fork system call of the guest operating system.

* * * * *